United States Patent
Knoth et al.

(10) Patent No.: US 12,391,559 B2
(45) Date of Patent: Aug. 19, 2025

(54) PROCESS FOR REMOVING AN IMPURITY FROM A CHLOROSILANE MIXTURE

(71) Applicant: WACKER CHEMIE AG, Munich (DE)

(72) Inventors: Jens Felix Knoth, Marktl (DE); Uwe Pätzold, Burghausen (DE)

(73) Assignee: Wacker Chemie AG, Munich (DE)

( * ) Notice: Subject to any disclaimer, the term of this patent is extended or adjusted under 35 U.S.C. 154(b) by 607 days.

(21) Appl. No.: 17/910,840

(22) PCT Filed: Nov. 5, 2020

(86) PCT No.: PCT/EP2020/081101
§ 371 (c)(1),
(2) Date: Sep. 12, 2022

(87) PCT Pub. No.: WO2022/096098
PCT Pub. Date: May 12, 2022

(65) Prior Publication Data
US 2023/0097766 A1    Mar. 30, 2023

(51) Int. Cl.
*C01B 33/107*    (2006.01)
*B01J 20/26*    (2006.01)

(52) U.S. Cl.
CPC ......... *C01B 33/10784* (2013.01); *B01J 20/26* (2013.01)

(58) Field of Classification Search
CPC ............................ C01B 33/10784; B01J 20/26
See application file for complete search history.

(56) References Cited

U.S. PATENT DOCUMENTS

| | | | |
|---|---|---|---|
| 3,414,603 A | 12/1968 | Mlavsky | |
| 3,627,501 A | 12/1971 | Kruger | |
| 2012/0148471 A1* | 6/2012 | Sugimura | C01B 33/10778 423/342 |

FOREIGN PATENT DOCUMENTS

| | | |
|---|---|---|
| CA | 1162028 A | 2/1984 |
| CN | 101735372 A | 6/2010 |
| CN | 101913610 B | 12/2010 |
| CN | 103553058 A | 2/2014 |
| CN | 105329902 A | 2/2016 |
| CN | 106215955 A | 12/2016 |
| CN | 106366110 A | 2/2017 |
| CN | 109205627 A | 1/2019 |
| CN | 110613955 A | 12/2019 |
| CN | 111036029 A | 4/2020 |
| CN | 111115637 A | 5/2020 |
| DE | 1073460 B | 1/1960 |
| DE | 1144245 B | 2/1963 |
| DE | 1767905 A | 9/1971 |
| DE | 102008054537 A1 | 6/2010 |
| DE | 102011077455 A1 | 11/2011 |
| DE | 102011003453 A1 | 8/2012 |
| DE | 102014225460 A1 | 6/2016 |
| JP | 2000169131 A | 6/2000 |
| JP | 2010269994 A | 12/2010 |
| KR | 101134230 B1 | 4/2012 |
| KR | 20160143973 A | 12/2016 |
| WO | 2011006695 A1 | 1/2011 |
| WO | 2011024276 A1 | 3/2011 |

OTHER PUBLICATIONS

AmberLyst-A21-Ion Exchange Resin, Modified Polystyrene-divinylbenzene-free base form, Dupont Product Data Sheet, (Jan. 2021).*
Xu Huaide, Luo Anwei: "Natural product extraction technology" (second edition), Jul. 2021, pp. 68-69, China Light Industry Press, Beijing, China.
Zhang Renzhi: "Water pollution control technology" (new 2nd edition), Aug. 2018, pp. 262-263, Wuhan University of Technology Press, Wuhan, China.

* cited by examiner

Primary Examiner — Yong L Chu

(57) ABSTRACT

A process for removing an impurity from a mixture containing at least one chlorosilane and/or organochlorosilane and at least one impurity from the group comprising a boron compound, a phosphorus compound, and an arsenic compound is provided. The process includes contacting the liquid mixture with an unfunctionalized organic polymer having pores with an average pore diameter of less than 50 Å, the average pore diameter being determined in accordance with DIN ISO 66134, and optionally removing the unfunctionalized organic polymer.

15 Claims, No Drawings

PROCESS FOR REMOVING AN IMPURITY FROM A CHLOROSILANE MIXTURE

CROSS-REFERENCE TO RELATED APPLICATION

This application is a U.S. National Phase Application of PCT/EP2020/081101, filed Nov. 5, 2020, the contents of which are hereby incorporated by reference in their entirety.

BACKGROUND

The invention relates to a process for removing an impurity from a mixture containing at least one chlorosilane and/or organochlorosilane and at least one impurity from the group comprising boron compound, phosphorus compound, and arsenic compound.

In the production of halosilanes, and of chlorosilanes in particular, impurities can occur that contain for example boron, arsenic, phosphorus or also antimony. Halosilanes are the starting material for the production of polycrystalline silicon (polysilicon, for example by the Siemens process). Polysilicon is in turn inter alia the starting material for production of single-crystal silicon used in the semiconductor industry for the manufacture of electronic components (for example diodes, bipolar transistors and MOS transistors). The manufacture of these electronic components normally involves a localized contamination of the single-crystal silicon with dopants (for example boron, arsenic) to achieve targeted influencing of electrical conductivity. It is thus imperative that the polysilicon used as starting material and the precursors thereof already have the lowest possible content of dopants.

Typical impurities are for example hydrogen and halogen compounds of boron, arsenic, phosphorus, and antimony. These can normally be removed from the halosilanes by distillation only with difficulty. The impurities may then consequently recur, to some degree at least, in the silicon intermediate or end product (for example polysilicon, single-crystal silicon, silicones). Monitoring of the nature and amount of impurities is therefore a necessary element of quality control. Polysilicon used for solar and semiconductor applications should ideally have a boron concentration of less than 20 ppta.

Chlorosilanes, in particular trichlorosilane (TCS), can be produced by three processes based on the following reactions:

$$SiCl_4 + H_2 \rightarrow SiHCl_3 + HCl + \text{by-products} \quad (1)$$

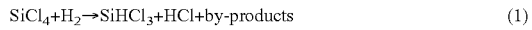

$$Si + 3SiCl_4 + 2H_2 \rightarrow 4SiHCl_3 + \text{by-products} \quad (2)$$

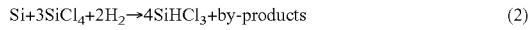

$$Si + 3HCl \rightarrow SiHCl_3 + H_2 + \text{by-products} \quad (3)$$

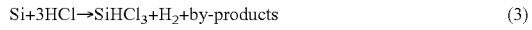

By-products that can occur include further chlorosilanes, for example monochlorosilane ($H_3SiCl$), dichlorosilane (DCS, $H_2SiCl_2$), silicon tetrachloride (STC, $SiCl_4$), and also di- and oligosilanes. In addition to the abovementioned impurities, impurities such as hydrocarbons and other non-metal compounds, organochlorosilanes, and metal chlorides may also be a constituent of the by-products.

The impurities introduced with the metallurgical silicon typically employed in processes (2) and (3) can in particular be carried over into subsequent process steps. Especially important here in addition to carbon are classical dopants such as boron, arsenic, and phosphorus. Compounds containing boron can cause particular problems, since boron, on account of its partition coefficient of 0.8, is virtually impossible to separate from silicon by zone melting in the course of the process. Depending on the quality of the employed raw materials and of the material of the reactor components and also the respective reaction conditions, varying contents of impurities are found in the crude products of processes (1) to (3). It is customary to purify by distillation the crude products obtained. However, this purification can in some cases be technically very complicated because of the similar boiling points of the product and the impurity. For example, boron trichloride (boiling point: 12.4° C.) can be removed from DCS (boiling point: 8.4° C.) by distillation only very laboriously.

Moreover, the use of organochlorosilanes demands the highest possible degree of purity, particularly in the field of nanotechnology and microelectronics.

Organochlorosilanes, in particular methylchlorosilanes, are produced in particular by the Müller-Rochow direct synthesis (cf. DE 10 2014 225 460 A1):

$$Si + CH_3Cl \rightarrow (CH_3)_n SiCl_{4-n} + \text{by-products}, (n=1\text{–}4) \quad (4)$$

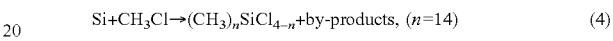

This involves reacting an organic chlorohydrocarbon compound with metallurgical silicon with addition of copper catalysts and promoters to afford organochlorosilanes, in particular methylchlorosilanes. Here too it is possible for impurities to be carried over, particularly via the metallurgical silicon.

Organochlorosilanes are used for example in the semiconductor industry in the deposition of epitaxial layers. Here, even the smallest amounts of impurities, in particular those containing dopants such as boron, phosphorus, arsenic, and antimony, cause considerable problems.

Generally, dopants can result in undesirable doping effects and reduce the service life of electrical components through migration processes.

Distillation to obtain high-purity chlorosilanes and organochlorosilanes normally gives rise to sidestreams containing the impurities. To remove the impurities, the sidestreams are usually completely removed, thereby leading to the loss of not inconsiderable amounts of value product. This can result in high costs (silicon losses, halogen losses, disposal costs). In addition, the sometimes multistage distillation requires a high input of energy, usually in the form of steam.

DE102011003453 discloses the presence of various dopant-containing compounds having different boiling points in a composite for the production of polysilicon. A complex multi-stage distillation as well as the elimination (and thus loss of value products) of several substreams is therefore necessary.

Various approaches are therefore employed to achieve effective removal of dopant-containing impurities in particular.

CA 1162028 A discloses the removal of boron-containing impurities in the disproportionation of chlorosilanes by adsorption onto a solid ion exchanger. The ion exchanger contains tertiary or quaternary ammonium groups. A disadvantage is the use of a functionalized adsorbent. The organonitrogen compound can here represent a possible source of contamination for the target product.

DE 1 073 460 describes a purification of gaseous chlorosilanes in which said chlorosilanes are passed over an adsorbent. The adsorbent is laden with organic or inorganic substances that form stable addition compounds with gaseous boranes but do not undergo reaction with the chlorosilanes. A disadvantage here is that performance in the gas phase requires initial vaporization of chlorosilanes present in liquid form. The gas phase is required in order to avoid washing out the organic or inorganic substances from the adsorbent impregnated therewith, since these are not chemically attached. Moreover, the high gas volume by comparison with liquid systems generally means that only markedly lower throughputs are achievable.

The use of activated carbon having a specific surface area of at least 1300 m$^2$/g for removing boron and phosphorus from chlorosilanes is described in JP2020269994. In addition, CN101913610 describes the removal of boron from TCS by adsorption on activated carbon having a pore size of 20 nm and a specific surface area of 500 to 2500 m$^2$/g.

According to DE 1 767 905, the use of activated carbon results in the disproportionation of chlorosilanes, which is not always desirable, since the resulting product mixture usually needs to be laboriously separated. DE 1 144 245 describes the use of activated carbon for the comproportionation of silane with chlorosilanes in the production of DCS.

CN109205627 describes a multi-stage purification of TCS in which, in an initial adsorption step, boron and phosphorus are adsorbed on a pyrolyzed polymer adsorbent having an average pore size of 110 Å and a specific surface area of 33 m$^2$/g. In subsequent steps, dimethychlorosilane and methyldichlorosilane are removed on molecular sieves, activated carbon or silica gel having average pore sizes of 20 to 25 Å and specific surface areas of 650 to 700 m$^2$/g. The adsorbent is here functionalized for example with organic amines. As a result of pyrolysis of the polymer adsorbent, there is a risk of contamination of the target product with pyrolysis residues and adsorbent degradation products.

It was an object of the present invention to provide an efficient and economic process for purifying chlorosilanes and organochlorosilanes in which known disadvantages of the prior art are avoided.

BRIEF SUMMARY

Embodiments of a process for removing an impurity from a mixture containing at least one chlorosilane and/or organochlorosilane and at least one impurity from the group comprising a boron compound, a phosphorus compound, and an arsenic compound are described below. In an embodiment, the process includes contacting the liquid mixture with an unfunctionalized organic polymer having pores with an average pore diameter of less than 50 Å, the average pore diameter being determined in accordance with DIN ISO 66134, and optionally removing the unfunctionalized organic polymer.

DETAILED DESCRIPTION

This object is achieved by a process for removing an impurity from a mixture containing at least one chlorosilane and/or organochlorosilane and at least one impurity from the group comprising boron compound, phosphorus compound, and arsenic compound, said process comprising the steps of:
a) contacting the liquid mixture with an unfunctionalized organic polymer having pores with an average pore diameter of less than 50 Å;
b) optionally removing the unfunctionalized organic polymer.

After the removal and/or contacting steps, the mixture has a reduced content of impurities. The impurity is optionally removed from the mixture completely.

The average pore diameter is preferably 15 to 48 Å, more preferably 20 to 47 Å, in particular 26 to 46 Å.

The average pore diameter is here determined in accordance with DIN ISO 66134.

The use of the unfunctionalized organic polymer has been found to achieve a particularly high level of effectiveness of usually more than 85% in the removal.

The use of the unfunctionalized organic polymer also minimizes the risk of contamination. When using adsorbents having functional groups, for example organonitrogen-functionalized adsorbents, cleavage of the functional group can result in contamination of the target product.

"Unfunctionalized" or "non-functionalized" is to be understood as meaning that the molecular backbone of the organic polymer used, which is made up of carbon and hydrogen atoms, does not have any additionally introduced functional groups. In other words, the adsorbent material does not prior to contacting bear any additional chemically attached functional groups, in particular any carboxyl, carbonyl, nitrogen-containing, or phosphorus-containing groups. "Unfunctionalized" is further to be understood as meaning that the adsorbent material is not impregnated prior to contacting, in particular not with catalytically or adsorptively active substances and/or metals/metalloids.

The organic polymer is in principle also not subjected to any heat treatment prior to use. Heat treatment should be understood as meaning temperatures of more than 600° C., preferably 400° C., in particular 200° C.

The unfunctionalized organic polymer preferably has a pore count maximum at a pore diameter of <100 Å, more preferably of <85 Å, in particular of <60 Å. The pore count maximum is determined in accordance with DIN 66134.

In a preferred embodiment, the unfunctionalized organic polymer has a specific surface area of 25 to 1050 m$^2$/g, preferably of 250 to 900 m$^2$/g, more preferably of 500 to 900 m$^2$/g.

It has been found that with this specific surface area no redistribution (i.e. generally no dismutation: no disproportionation or comproportionation reactions) of the chlorosilane and/or organochlorosilane takes place. This eliminates the need for a subsequent separation of a multicomponent mixture resulting from redistribution, which would otherwise be necessary. Thus, a contact time of 24 h results in the formation of usually less than 1.5% by weight, in particular less than 1.0% by weight, of disproportionation and/or comproportionation products. This figure is in fact generally less than 0.5% by weight.

In a further embodiment, the unfunctionalized organic polymer has a specific surface area of >1050 m$^2$/g, preferably of >1100 m$^2$/g, more preferably of >1125 m$^2$/g, wherein a value of 2500 m$^2$/g should not be exceeded.

It has been found that this specific surface area, while having comparable efficiency in respect of removal of the impurity, favors disproportionation and/or comproportionation reactions. For example, a contact time of 24 h results in the formation of usually more than 10% by weight, in particular more than 13% by weight, of disproportionation and/or comproportionation products. In some cases it can even be more than 15% by weight.

Such redistribution can be desirable when additional TCS according to equation (5) is to be obtained from by-products such as DCS and STC.

$$SiH_2Cl_2 + SiCl_4 \rightarrow 2SiHCl_3 \tag{5}$$

Alternatively, DCS can for example be selectively generated from TCS present in the mixture, which can be employed for example to increase the deposition rate in the Siemens process.

The specific surface area is determined in accordance with DIN ISO 9277.

The process pressure and process temperature are chosen such that the mixture is in the liquid state. Process step a) is preferably carried out within a pressure range from 1 to 20 bar (a), more preferably from 1.1 to 10 bar (a), in particular from 1.25 to 5 bar (a). The temperature can be −50 to 160° C., preferably 31 20° C. to 120° C., more preferably 0° C. to 100° C., in particular 10° C. to 80° C.

The chlorosilane can be an acyclic chlorosilane of the general formula $H_xSi_nCl_{(2n+2-x)}$, where $0 \leq x \geq 12$ and $1 \leq n \geq 5$, and/or a cyclic chlorosilane of the general formula $H_xSi_nCl_{(2n-x)}$, where $0 \leq x \geq 20$ and $5 \leq n \geq 10$. The mixture may contain just one or else two or more of these chlorosilanes.

The chlorosilane is in particular selected from the group comprising STC, TCS, DCS, monochlorosilane, and combinations thereof.

The organochlorosilane is preferably an acyclic organochlorosilane of the general formula $H_xSi_nR^3{}_yCl_{(2n+2-x-y)}$, where $0 \leq x \geq 11$, $1 \leq n \geq 5$, and $1 \leq y \geq 12$, and/or a cyclic organochlorosilane of the general formula $H_xSi_nR^3{}_yCl_{(2n+2-x-y)}$, where $0 \leq x \geq 19$, $5 \leq n \geq 10$, and $1 \leq y \geq 20$ and where $R^3$=alkyl, aryl, alkylaryl or alkoxy.

The alkyl radical (for $R^3$) may be linear, branched or cyclic. It may for example be a radical selected from the group comprising Me, Et, Pr, i-Pr, n-Bu, i-Bu, t-Bu. The alkyl radical preferably comprises 1 to 16, more preferably 1 to 12, in particular 1 to 6, carbon atoms. It is however preferable when $R^3$ is a methyl, methoxy or ethoxy radical.

The process according to the invention is preferably executed under anhydrous or at least largely anhydrous conditions. "Largely anhydrous" is to be understood as meaning that traces of water may be present in the unfunctionalized polymer. This is a water content of usually less than 5% by weight, preferably less than 3% by weight, more preferably less than 2% by weight.

To avoid losses through chlorosilane/organochlorosilane hydrolysis, the water content is normally kept as low as possible. Thus, in principle no moisture is additionally supplied.

It may be necessary to subject the unfunctionalized polymer to a drying step before step a). However, preference is given to using an unfunctionalized polymer already commercially available with a water content of <5% by weight, preferably <3% by weight, more preferably <2% by weight.

The unfunctionalized polymer may be a polymer for the production of ion exchangers and adsorbents.

The unfunctionalized organic polymer is preferably selected from the group comprising polystyrene, polyvinylbenzene, styrene-divinylbenzene copolymer, and combinations thereof. It may also be polyethylene, optionally in combination with the abovementioned polymers.

The unfunctionalized adsorbent material preferably comprises a styrene-divinylbenzene copolymer.

In a preferred embodiment of the process, the unfunctionalized polymer comprises a hypercrosslinked polymer. This is a polymer/copolymer or terpolymer that undergoes further crosslinking after the polymerization. The crosslinking can be carried out e.g. by means of emulsion polymerization, for example with the addition of a crosslinker or by internal crosslinking. Hypercrosslinking can optionally also be carried out in the presence of a pore-former (porogen), for example toluene. The hypercrosslinked polymers may in particular also have porosities in the micropore range (<20 Å).

The unfunctionalized organic polymer may be present in the form of particles and/or fibers. It is particularly preferably in particulate form.

For example, said material may be in the form of particles having an average particle size (=average particle diameter) of 0.149 to 4.760 mm (4 to 100 mesh), preferably 0.177 to 2.000 mm (10 to 80 mesh), more preferably 0.210 to 1.410 mm (14 to 70 mesh). The determination may be carried out by dynamic image analysis (ISO 13322-2), laser diffraction or sieving.

The unfunctionalized organic polymer may show swelling behavior as a result of the contacting with the mixture.

The physical stability of the unfunctionalized organic polymer (crushing strength) is preferably over 400 g/bead, more preferably over 500 g/bead.

The unfunctionalized organic polymer is in process step a) preferably in the form of a fixed bed. In particular, the mixture passes through the fixed bed in a continuous stream. This makes it possible to dispense with separate removal of the unfunctionalized organic polymer.

In a preferred embodiment, the unfunctionalized organic polymer is in step a) in the form of a fixed bed in one or more containers arranged in series or in parallel, through which the mixture preferably passes in a continuous stream.

The hydrodynamic residence time τ of the mixture in a volume (container) filled with the unfunctionalized organic polymer is preferably 0.1 to 100 000 s, more preferably 0.5 to 10 000 s, in particular 1 to 1000 s.

τ is calculated according to $$\tau = \frac{V_R}{\dot{V}},$$

where $V_R$: Reaction volume: volume filled with unfunctionalized organic polymer [m³],
$\dot{V}$: Volume flow of the mixture [m³/s].

The unfunctionalized organic polymer present in the form of a fixed bed is preferably retained by means of a screen or a perforated plate.

It is in principle possible for the mixture to remain in contact with the unfunctionalized organic polymer in the form of a fixed bed or a fluidized bed for a predefined time and then be removed. In the simplest case, removal may be effected by draining the mixture from a container, resulting in the retention of the solid, unfunctionalized organic polymer by a screen or a perforated plate.

The removal in process step b) of the unfunctionalized organic polymer laden with the impurity is preferably effected by solid-liquid separation, in particular by filtration.

Before step a) and/or after step a) or optionally after step b), it is preferable to determine the concentration of the impurity in the mixture. This makes it possible to adjust the volume flow of the mixture, for example when the unfunctionalized organic polymer passes through the fixed bed in a continuous stream. In addition, as soon as the impurity concentration after passage of the unfunctionalized organic polymer exceeds a nominal value, a switch can be made to a parallel adsorbent path of identical construction. This maximizes uptimes. The concentration of the impurities may be determined by ICP-MS (mass spectrometry with inductively coupled plasma) and/or ICP-OES (optical emission spectrometry with inductively coupled plasma), continuous sampling being preferable. Another option for determining the concentration of the impurity for example in a chlorosilane mixture employed in the context of the Siemens process is measurement of the electrical resistance of the deposited silicon. The measurement of electrical resistance may be carried out in accordance with standard SEMI MF84. The dopants in the deposited silicon can also be determined by photoluminescence as described for example in DE 10 2011 077 455 A1.

In a preferred embodiment, the mixture can after a first contacting with the unfunctionalized organic polymer according to process step a) be recycled to the as yet untreated mixture upstream of step a) so as to be recontacted with the unfunctionalized organic polymer. It may be preferable to perform step a) two or more times.

The impurity is in particular compounds of boron, phosphorus and/or arsenic with hydrogen, halogen, carbon and/or silicon (for example $AsCl_3$). The mixture may contain different compounds of one or more of the recited elements as impurity. The impurity preferably comprises compounds of boron and/or phosphorus (for example $PCl_3$, $PHCl_2$; $MePH_2$; $MeSiH_2PH_2$). It particularly preferably comprises compounds of boron. In particular, it may comprise boranes (for example $B_2H_6$) and/or haloboranes ($BCl_3$).

The at least one impurity is usually not in ionic form.

The mixture may contain (before process step a)) a proportion of 5 pptw to 1000 ppmw, preferably 10 pptw to 500 ppmw, more preferably 50 pptw to 100 ppmw, of the impurity.

If the mixture comprises a boron compound, the proportion of the boron compound present after process step a) or optionally after process step b) is preferably reduced by 85%, more preferably by 90%. It is also possible for boron depletion to be over 95%.

If the mixture comprises a phosphorus compound or arsenic compound, the proportion of said compound present after process step a) or optionally after process step b) is preferably reduced by 70%, more preferably by 80%, in particular by 85%. It is also possible for depletion to be over 85%.

In a preferred embodiment, steps a) and b) are incorporated into an integrated system for polysilicon production. The integrated system preferably encompasses the following processes:

Production of a technical grade TCS-containing chlorosilane mixture (process (1) to (3)), purification of the generated chlorosilane mixture by the process of the invention; deposition of polysilicon, preferably by the Siemens process or as granulate.

In a further preferred embodiment, steps a) and b) are incorporated into an integrated system for silicon production. To enable a particularly economical mode of operation, the unfunctionalized organic polymer can, depending on requirements, be selected such that a redistribution of chlorosilanes does or does not occur.

The use of the unfunctionalized organic polymer for removing boron compounds, phosphorus compounds and/or arsenic compounds from a mixture containing chlorosilanes and/or organochlorosilanes is also described. As regards the configuration of the polymer, reference can be made to what has been said above.

EXAMPLES

Example 1: General Procedure 20 g of a chlorosilane mixture (>99.9% TCS) was added to 0.68 g of the unfunctionalized polymer in a glass flask at 22° C. and 1 bar (a). The polymer was subsequently removed by filtration and the ratio of the chlorosilanes in the mixture obtained was analyzed by gas chromatography with a thermal conductivity detector (GC-TCD). The boron concentration was determined by ICP-OES before and after the contacting.

Example 1

A styrene polymer (hypercrosslinked) having an average pore diameter of 46 Å and a specific surface area of 1138 $m^2/g$ and with high physical stability (crush strength >500 g/beads) was used.

TABLE 1

|  | Before contacting the mixture with the polymer | After contacting the mixture with the polymer |
| --- | --- | --- |
| Boron [ppbw] | 7000 | 270 |

A boron retention of 96% is achieved.

TABLE 2

| Component | before step a) | after step b) |
| --- | --- | --- |
| Monochlorosilane/wt. % | 0.0000 | 0.0819 |
| DCS/wt. % | 0.0010 | 5.7989 |
| TCS/wt. % | 99.9757 | 82.3719 |
| STC/wt. % | 0.0233 | 11.7473 |

>17.5% by weight of disproportionation products was formed (sum of monochlorosilane, DCS, STC).

Example 2

A styrene polymer having an average pore diameter of 45 Å and a specific surface area of 937 $m^2/g$ was used. The pore count maximum was at a pore diameter of 81 Å (pore diameter distribution in accordance with DIN 66134).

TABLE 3

|  | Before contacting the mixture with the polymer | After contacting the mixture with the polymer |
| --- | --- | --- |
| Boron [ppbw] | 13000 | 1500 |

A boron retention of 88% is achieved.

TABLE 4

| Component | before step a) | after step b) |
| --- | --- | --- |
| Monochlorosilane/wt. % | 0.0000 | 0.0000 |
| DCS/wt. % | 0.0003 | 0.0009 |
| TCS/wt. % | 99.9967 | 99.9891 |
| STC/wt. % | 0.0030 | 0.0100 |

Less than 0.1% by weight of disproportionation products was formed (sum of monochlorosilane, DCS, STC).

Example 3

A styrene polymer having an average pore diameter of 48 Å and a specific surface area of 554 $m^2/g$ was used. The pore count maximum was at a pore diameter of 58 Å (pore diameter distribution in accordance with DIN 66134).

TABLE 5

|  | Before contacting with the polymer | After contacting with the polymer |
|---|---|---|
| Boron [ppbw] | 6200 | 250 |

A boron retention of 96% is achieved.

TABLE 6

| Component | before step a) | after step b) |
|---|---|---|
| Monochlorosilane/wt. % | 0.0000 | 0.0000 |
| DCS/wt. % | 0.0003 | 0.0011 |
| TCS/wt. % | 99.9967 | 99.3209 |
| STC/wt. % | 0.0030 | 0.6780 |

<0.7% by weight of disproportionation products was formed (sum of monochlorosilane, DCS, STC).

Comparative Example 1

A styrene-DVB polymer having an average pore diameter of 50 Å and a specific surface area of 862 m²/g was used. The maximum in the pore diameter distribution in accordance with DIN 66134) was at 100 Å.

TABLE 7

|  | Before contacting with the polymer | After contacting with the polymer |
|---|---|---|
| Boron [ppbw] | 7000 | 1100 |

A boron retention of only 84% is achieved.

TABLE 8

| Component | before step a) | after step b) |
|---|---|---|
| Monochlorosilane/wt. % | 0.0000 | 0.0136 |
| DCS/wt. % | 0.0003 | 0.0032 |
| TCS/wt. % | 99.9993 | 99.7878 |
| STC/wt. % | 0.0004 | 0.1954 |

<0.25% by weight of disproportionation products was formed (sum of monochlorosilane, DCS, STC).

Comparative Example 2

A crosslinked styrene-DVB polymer (Amberlite XAD-1180) having an average pore diameter of 300 Å and a specific surface area of >600 m²/g was used.

TABLE 9

|  | Before contacting with the polymer | After contacting with the polymer |
|---|---|---|
| Boron [ppbw] | 11000 | 4300 |

A boron retention of only 61% is achieved.

TABLE 10

| Component | before step a) | after step b) |
|---|---|---|
| Monochlorosilane/wt. % | 0.0000 | 0.0000 |
| DCS/wt. % | 0.0000 | 0.0005 |
| TCS/wt. % | 99.9999 | 99.9722 |
| STC/wt. % | 0.0000 | 0.0273 |

<0.1% by weight of disproportionation products was formed (sum of monochlorosilane, DCS, STC).

The invention claimed is:

1. A process for removing an impurity from a mixture containing at least one chlorosilane and/or organochlorosilane and at least one impurity from the group comprising boron compound, phosphorus compound, and arsenic compound, said process comprising the steps of:
    a) contacting the liquid mixture with an unfunctionalized organic polymer having pores with an average pore diameter of less than 50 Å, the average pore diameter being determined in accordance with DIN ISO 66134;
    b) optionally removing the unfunctionalized organic polymer.

2. The process as claimed in claim 1, wherein the average pore diameter is 15 to 48 Å.

3. The process as claimed in claim 1, wherein the unfunctionalized organic polymer has a pore count maximum at a pore diameter of <100 Å.

4. The process as claimed in claim 1, wherein the unfunctionalized organic polymer has a specific surface area of 25 to 1050 m²/g.

5. The process as claimed in claim 1, wherein the unfunctionalized organic polymer has a specific surface area of >1050 m²/g, with the proviso that a value of 2500 m²/g is not exceeded.

6. The process as claimed in claim 1, wherein the chlorosilane is an acyclic chlorosilane of the general formula $H_xSi_nCl_{(2n+2-x)}$, where $0 \leq x \geq 12$ and $1 \leq n \geq 5$, and/or a cyclic chlorosilane of the general formula $H_xSi_nCl_{(2n-x)}$, where $0 \leq x \geq 20$ and $5 \leq n \geq 10$.

7. The process as claimed in claim 1, wherein the chlorosilane is selected from the group comprising silicon tetrachloride, trichlorosilane, dichlorosilane, monochlorosilane, and combinations thereof.

8. The process as claimed in claim 1, wherein the organochlorosilane is an acyclic organochlorosilane of the general formula $H_xSi_nR^3_yCl_{(2n+2-x-y)}$, where $0 \leq x \geq 11$, $1 \leq n \geq 5$, and $1 \leq y \geq 12$, and/or a cyclic organochlorosilane of the general formula $H_xSi_nR^3_yCl_{(2n-x-y)}$, where $0 \leq x \geq 19$, $5 \leq n \geq 10$, and $1 \leq y \geq 20$ and where $R^3$=alkyl, aryl, alkylaryl or alkoxy.

9. The process as claimed in claim 1, wherein the unfunctionalized organic polymer contains a proportion of water of less than 5% by weight.

10. The process as claimed in claim 1, wherein the unfunctionalized organic polymer is selected from the group comprising polyethylene, polystyrene, polydivinylbenzene, styrene-divinylbenzene copolymer, and combinations thereof.

11. The process as claimed in claim 10, wherein the unfunctionalized organic polymer comprises a styrene-divinylbenzene copolymer.

12. The process as claimed in claim 1, wherein the unfunctionalized organic polymer comprises a hypercrosslinked polymer.

13. The process as claimed in claim 1, wherein the unfunctionalized organic polymer in particulate form has an average particle size of 0.149 to 4.760 mm.

14. The process as claimed in claim 1, wherein in step a) the unfunctionalized organic polymer is in the form of a fixed bed in one or more containers arranged in series or in parallel, through which the mixture passes in a continuous stream.

15. The process as claimed in claim 14, wherein the hydrodynamic residence time of the mixture in the reaction volume is 0.1 to 100 000 s.

\* \* \* \* \*